US011725469B2

(12) United States Patent
Lien et al.

(10) Patent No.: US 11,725,469 B2
(45) Date of Patent: Aug. 15, 2023

(54) METHODS AND SYSTEMS FOR EARTH DRILLING

(71) Applicant: MHWIRTH AS, Kristiansand (NO)

(72) Inventors: Geir Lien, Hoevag (NO); Petter Mydland, Kristiansand (NO)

(73) Assignee: MHWIRTH AS, Kristiansand (NO)

( * ) Notice: Subject to any disclaimer, the term of this patent is extended or adjusted under 35 U.S.C. 154(b) by 24 days.

(21) Appl. No.: 17/442,637

(22) PCT Filed: Mar. 26, 2020

(86) PCT No.: PCT/NO2020/050088
§ 371 (c)(1),
(2) Date: Sep. 24, 2021

(87) PCT Pub. No.: WO2020/197412
PCT Pub. Date: Oct. 1, 2020

(65) Prior Publication Data
US 2022/0186571 A1   Jun. 16, 2022

(30) Foreign Application Priority Data

Mar. 27, 2019 (GB) .................................. 1904228
Sep. 13, 2019 (GB) .................................. 1913257
Oct. 16, 2019 (GB) .................................. 1914955
Oct. 23, 2019 (GB) .................................. 1915306
Dec. 5, 2019 (GB) .................................. 1917797

(51) Int. Cl.
*E21B 17/00* (2006.01)
*E21B 19/16* (2006.01)
*B25J 5/00* (2006.01)
*B25J 15/00* (2006.01)
*B25J 15/02* (2006.01)
*E21B 19/15* (2006.01)
*F16L 1/06* (2006.01)
*F16L 57/00* (2006.01)

(52) U.S. Cl.
CPC ............... *E21B 19/16* (2013.01); *B25J 5/007* (2013.01); *B25J 15/0028* (2013.01); *B25J 15/0253* (2013.01); *E21B 17/006* (2013.01); *E21B 19/155* (2013.01); *F16L 1/06* (2013.01); *F16L 57/005* (2013.01)

(58) Field of Classification Search
CPC .... E21B 19/16; E21B 19/155; E21B 17/0006; E21B 17/006; B16J 5/007; B16J 15/0028; B16J 15/0253; F16L 1/06; F16L 57/005
See application file for complete search history.

(56) References Cited

U.S. PATENT DOCUMENTS 2,575,649 A    11/1951   Abegg
2,696,039 A    12/1954   Baker
(Continued)

FOREIGN PATENT DOCUMENTS

CA    1 165 544 A      4/1984
CN    203357446 U     12/2013
(Continued)

*Primary Examiner* — Taras P Bemko
(74) *Attorney, Agent, or Firm* — Norman B. Thot

(57) ABSTRACT

A machine for a drilling plant includes a base, an arm, and a tool which is carried by the arm. The tool has a receiver for a protective cap. The machine is operable to engage the protective cap and to remove or to install the protective cap from or on an end of a drilling tubular.

16 Claims, 6 Drawing Sheets

(56) References Cited

U.S. PATENT DOCUMENTS

| | | | |
|---|---|---|---|
| 2,941,283 A * | 6/1960 | Taylor, Jr. | E21B 17/12 |
| | | | 29/236 |
| 4,397,605 A | 8/1983 | Cowgill et al. | |
| 4,442,737 A | 4/1984 | Miner | |
| 5,318,254 A | 6/1994 | Shaw et al. | |
| 5,524,672 A | 6/1996 | Mosing et al. | |
| 5,833,147 A | 11/1998 | Fuhlbrigge | |
| 6,565,668 B1 | 5/2003 | Sandberg et al. | |
| 2005/0082857 A1 | 4/2005 | Latiolais, Jr. et al. | |
| 2007/0236004 A1 | 10/2007 | Benedict | |
| 2008/0093091 A1 | 4/2008 | Mong et al. | |
| 2011/0126677 A1 | 6/2011 | Buchanan | |
| 2012/0097454 A1 | 4/2012 | Kockeis et al. | |
| 2014/0231076 A1 | 8/2014 | Brown | |
| 2015/0209940 A1 | 7/2015 | Kroll | |
| 2019/0003269 A1 | 1/2019 | Skjærseth et al. | |
| 2020/0040673 A1 | 2/2020 | Donnally et al. | |
| 2021/0355758 A1 * | 11/2021 | Lien | E21B 19/06 |

FOREIGN PATENT DOCUMENTS

| | | |
|---|---|---|
| GB | 615015 A | 12/1948 |
| GB | 2 014 102 A | 8/1979 |
| GB | 2 391 799 A | 2/2004 |
| GB | 2577290 A | 3/2020 |
| WO | WO 93/00261 A1 | 1/1993 |
| WO | WO 2014/031969 A1 | 2/2014 |
| WO | WO 2016/199103 A1 | 12/2016 |
| WO | WO 2020/028852 A1 | 2/2020 |
| WO | WO 2020/028853 A1 | 2/2020 |

* cited by examiner

METHODS AND SYSTEMS FOR EARTH DRILLING

CROSS REFERENCE TO PRIOR APPLICATIONS

This application is a U.S. National Phase application under 35 U.S.C. § 371 of International Application No. PCT/NO2020/050088, filed on Mar. 26, 2020 and which claims benefit to Great Britain Patent Application No. GB 1904228.2, filed on Mar. 27, 2019, to Great Britain Patent Application No. GB 1913257.0, filed on Sep. 13, 2019, to Great Britain Patent Application No. GB 1914955.8, filed on Oct. 16, 2019, to Great Britain Patent Application No. GB 1915306.3, filed on Oct. 23, 2019, and to Great Britain Patent Application No. GB 1917797.1, filed on Dec. 5, 2019. The International Application was published in English on Oct. 1, 2020 as WO 2020/197412 A1 under PCT Article 21(2).

FIELD

The present invention relates to earth drilling, and particularly to methods and systems for carrying out operations for earth drilling.

BACKGROUND

Drilling rigs have a platform directly under a derrick which provides a work area in which the rig crew can work. The driller's cabin, from which the major components of the rig are controlled, is located adjacent the drill floor.

The drill floor is the most dangerous location on a drilling rig because of the heavy equipment which is moved around the area, yet many tasks associated with the running of a drilling operation are currently carried out manually by personnel working on the drill floor. The most dangerous area of the drill flow is known as the red zone.

In drilling operations, it is common to build a string of tubulars, such as a drill string, on the drill floor above the well centre opening. The string is usually assembled using a series of threaded pipe sections, where the threaded connections are made up (or broken out) using appropriate machines, such as pipe handling machines and power tongs. A bottom hole assembly (BHA) including a drill bit, is mounted at the lowermost end of the drill string.

Documents which may be useful to understand the field of technology include U.S. Pat. No. 2,696,039; WO 2014/031969 A1; US 2011/126677; US 2007/236004 A1; U.S. Pat. No. 4,442,737; CA 1165544; U.S. Pat. No. 5,524,672; US 2005/0082857 A1; WO 2016/199103; GB2391799; WO9300261; U.S. Pat. No. 6,565,688; and GB 2014102.

It is desirable to further improve the reliability, operational lifetime and operational efficiency of processes and machines on drilling rigs. At the same time, health and safety requirements remain stringent for such operations, and there is a need for improved solutions which reduce the risk for personnel. The present invention has the objective to provide improved systems and methods in the abovementioned or other areas.

SUMMARY

In a first aspect, there is provided a machine for a drilling plant, the machine having a base, an arm, and a tool carried by the arm, the tool comprising a receiver for a protective cap, the machine being operable to engage the protective cap and remove or install the protective cap from or on an end of a drilling tubular.

The tool may comprise a plurality of engagement elements configured to engage an outer circumference of the protective cap to hold the protective cap fixed.

The engagement elements may comprise: a plurality of flexible members fixed on an inside of a circumferential holder, or a plurality of movable arms operable to engage the outer circumference of the protective cap, preferably wherein the movable arms are controllable.

The receiver may be rotatable and operable to spin in or spin out the protective cap from the end of the drilling tubular.

The receiver may be rotatable by means of a motor arranged on the arm.

In an embodiment, there is provided a drilling plant comprising a machine according to any of the preceding clauses, wherein the machine is arranged on or adjacent a drill floor and operable to engage the drilling tubular when the drilling tubular is held in a vertical position by a pipe handling machine.

The drilling plant may comprise a storage area for the protective cap, wherein the storage area is spaced from an operating area of the pipe handling machine.

The machine may be arranged: between the operating area of the pipe handling machine and the storage area; between the drill floor and the storage area; and/or between a well centre opening and the storage area.

The storage area may comprise a magazine for holding a plurality of protective caps.

The machine may be operable to retrieve a protective cap from the magazine without human intervention and/or place a protective cap in the magazine without human intervention.

The cap may have a first section and the tool may have a second section, the first and second sections being provided with a shape to rotationally interlock the cap and the tool when brought into engagement.

The first and second sections may comprise a protrusion, a depression, a slot or a groove.

In an embodiment, there is provided a method for operating a drilling plant, the method comprising: bringing a tubular into an operating area of a drill floor, the tubular having a protective cap at an end thereof; bringing a tool into engagement with the protective cap, the tool being arranged on a machine having an arm which is movable into the operating area; removing the protective cap from the tubular with the tool; operating the machine to bring the protective cap out of the operating area with the tool.

The step of removing the protective cap may comprise: rotating the tubular while holding the protective cap fixed with the tool, or operating the tool to rotate the protective cap while holding the tubular fixed.

The method may comprise operating the machine to place the protective cap in a storage area.

The step of operating the machine to place the protective cap in a storage area may comprise placing the protective cap in a magazine in the storage area.

In an embodiment, there is provided a method for operating a drilling plant, the method comprising: bringing a tubular out of a well and into an operating area of a drill floor, bringing a tool holding a protective cap into the operating area, the tool being arranged on a machine having an arm which is movable into the drill floor area; placing the protective cap on an end of the tubular with the tool; operating a pipe handling machine to bring the tubular out of the operating area.

The step of placing the protective cap on an end of the tubular with the tool may comprise: rotating the tubular while holding the protective cap fixed with the tool, or operating the tool to rotate the protective cap while holding the tubular fixed.

The method may comprise operating the machine to pick up the protective cap from a storage area.

The step of operating the machine to pick up the protective cap from a storage area may comprise picking the protective cap up from a magazine in the storage area.

BRIEF DESCRIPTION OF THE DRAWINGS

These and other characteristics will become clear from the following description of illustrative embodiments, given as non-restrictive examples, with reference to the attached drawings, in which.

DETAILED DESCRIPTION

Figure 1:
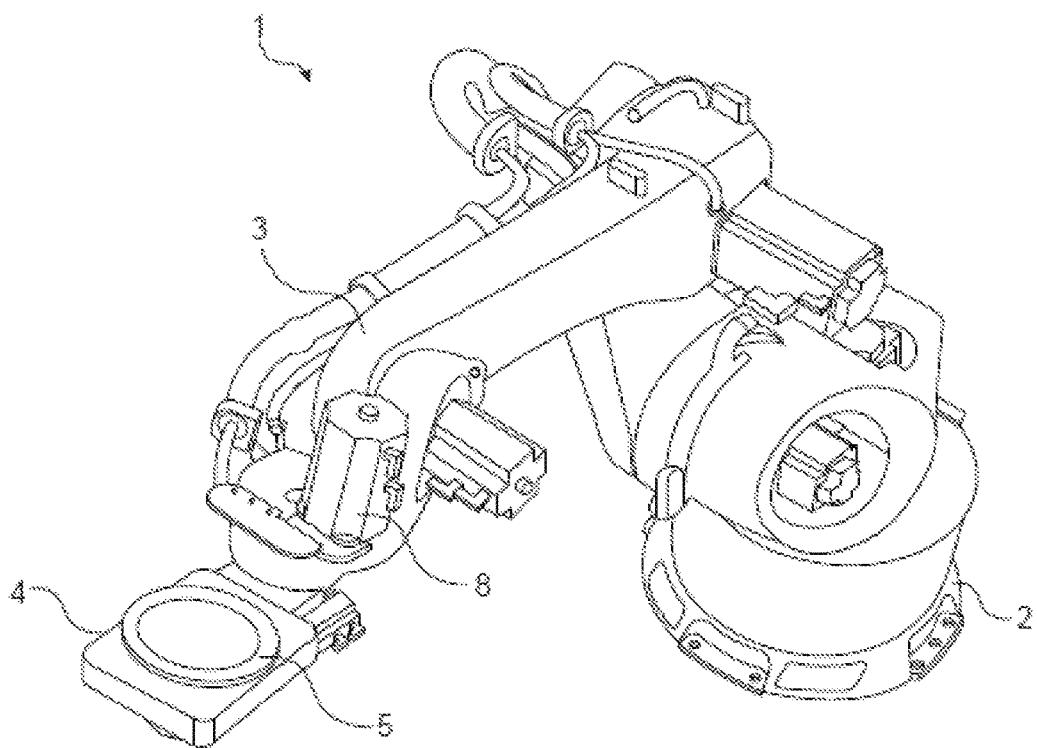
FIG. 1 illustrates a machine according to an embodiment.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

In a first aspect, embodiments of the present disclosure provide methods and systems for handling elongate pipes at (or near) a drill floor area on a drilling rig. The integrity of the connections between such pipes are generally of high importance, particularly considering the load the pipe string is exposed to during use and the fact that the same pipe sections may be subjected to make up (connect) and break out (disconnect) operations a large number of times during its lifetime. Prior to make-up of a connection, threads may be cleaned, and dope is usually applied on the threads before connection. A thread protector is often used for protecting the threads on the tubular from wear and tear. Today, the removal and mounting of these protecting devices is normally performed manually with personnel operating at or near the drill floor. This area is typically considered a "red zone" for safety purposes, i.e. it is desirable to avoid personnel present in this area as much as possible.

Figure 2:
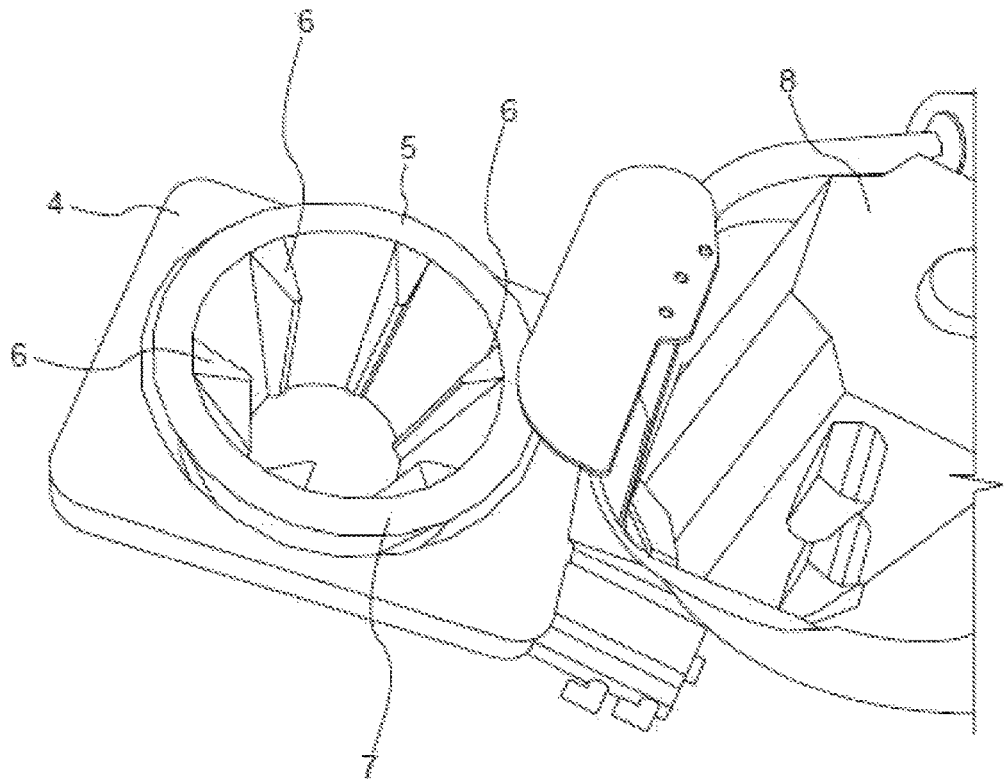
FIG. 2 illustrates details of the machine shown in FIG. 1.

FIGS. 1 and 2 illustrate a machine 1 for a drilling plant. The machine 1 has a base 2, an arm 3, and a tool 4 carried by the arm 3. The tool 4 comprises a receiver 5 for a protective cap, and the machine 1 is operable to engage the protective cap and remove or install the protective cap from or on an end of a drilling tubular, such as a drill pipe section.

Figure 3:
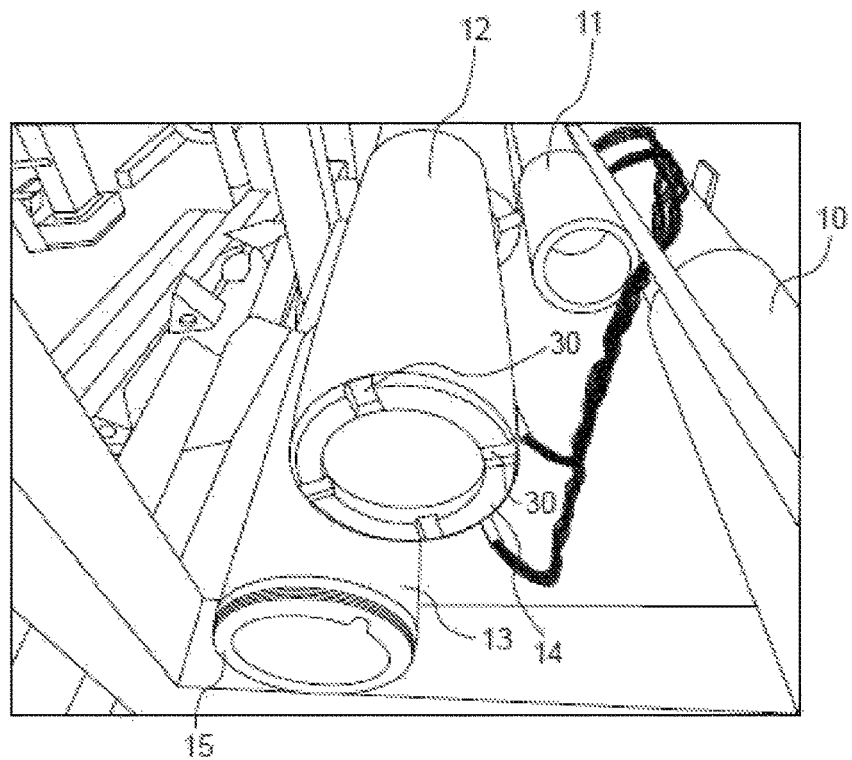
FIG. 3 illustrates tubular members for use in a drilling operation.

FIG. 3 illustrates sections of drill pipe 10-13. As can be seen, drill pipe sections 12 and 13 have protective caps 14,15 arranged at its ends. Protective cap 14 is arranged at a pin end (i.e. the male threaded end) of the pipe section 12, whereas the protective cap 15 is arranged at a box end (i.e. the female threaded end) of the pipe section 13.

As best seen in FIG. 2, the tool 4 may comprise a plurality of engagement elements 6 configured to engage an outer circumference of a protective cap 14,15 to hold the protective cap 14,15 fixed.

The engagement elements 6 may comprise, for example, a plurality of flexible members fixed on an inside of a circumferential holder 7, as shown in FIG. 2. The holder 7 may thus be a rigid or semi-rigid structure, while the engagement elements may be, for example, of an elastic material, such as rubber or similar.

Alternatively, the engagement elements 6 may be a plurality of movable arms operable to engage the outer circumference of the protective cap 14,15. The movable arms may be controllable arms which are radially movable to "grip" the protective cap 14,15 to allow the machine 1 to hold the cap for removing it or placing it on the end of the drilling tubular. Such an embodiment is described in further detail below.

The receiver 5 may be rotatable and operable to spin in or spin out the protective cap 14,15 from the end of the drilling tubular 10-13. This may be done by means of a motor 8 arranged on the arm 3. The machine 1 can thus be provided with both gripper and spin out (or spin in) functionality for the protective cap 14,15.

Alternatively, the receiver 5 may be held fixed by the machine 1, and the drilling tubular 10-13 is rotated (for example by means of a spinner tong or another pipe handling machine, such as a vertical pipe handler having grippers with spin functionality) in order to install or remove the protective cap 14,15 on or from the end of the drilling tubular 10-13.

Figure 4:
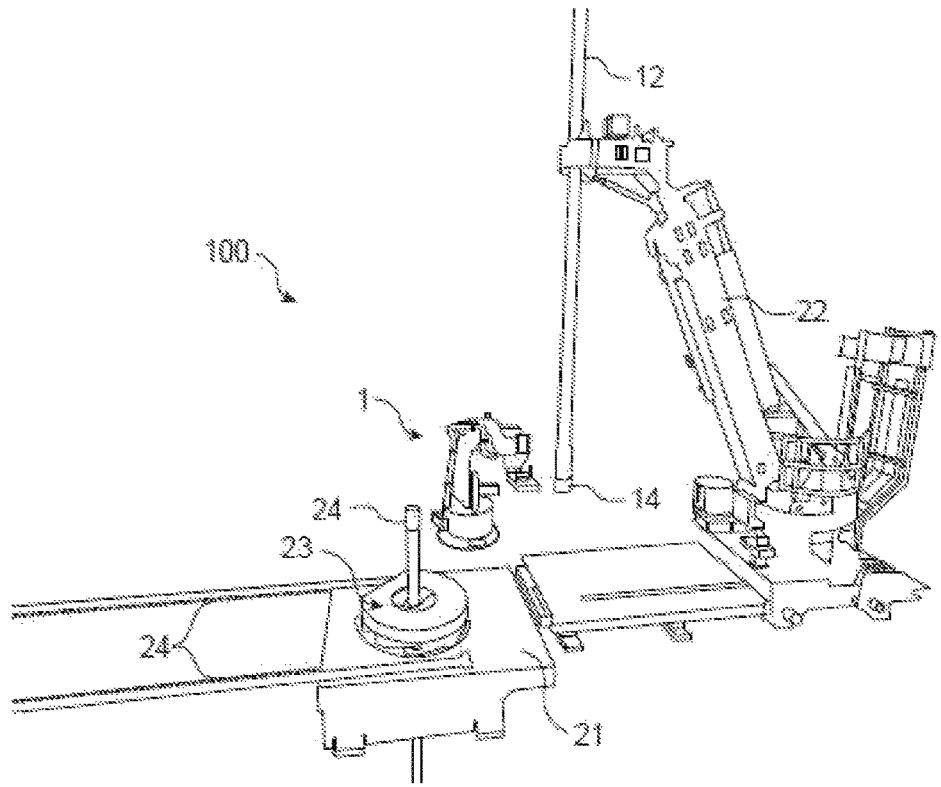
FIGS. 4-8 illustrate a drilling plant according to an embodiment.

Illustrated in FIG. 4, a drilling plant may comprise a machine 1 as described herein, where the machine 1 is arranged on or adjacent a drill floor 21. The machine 1 is operable to engage a drilling tubular 12 when the drilling tubular 12 is held in a vertical position above the drill floor 21 by a pipe handling machine 22. The machine 1 may thus be operable to extend the arm 3 above the drill floor 21. The base 2 may be placed on the drill floor 21 or beside it.

The drill floor 21 comprises a well centre opening 23. A drill string 24, made up of a plurality of drill pipe sections, may extend downwardly into a wellbore below the drill floor 21. The top end of the drill string 24 comprises a box end of a tool joint, to which the tubular 12 should be connected. A roughneck machine (not shown) is movable towards the well centre opening 23 via rails or tracks 24, in order to engage the two pipe ends and make up the connection. (Or, alternatively, break out the connection if the drill string 24 is being retrieved out of the well.)

The tubular 12 comprises a protective cap 14 at its lower end. The cap 14 protects the pin end of a lower tool joint on the tubular 12.

Figure 5:
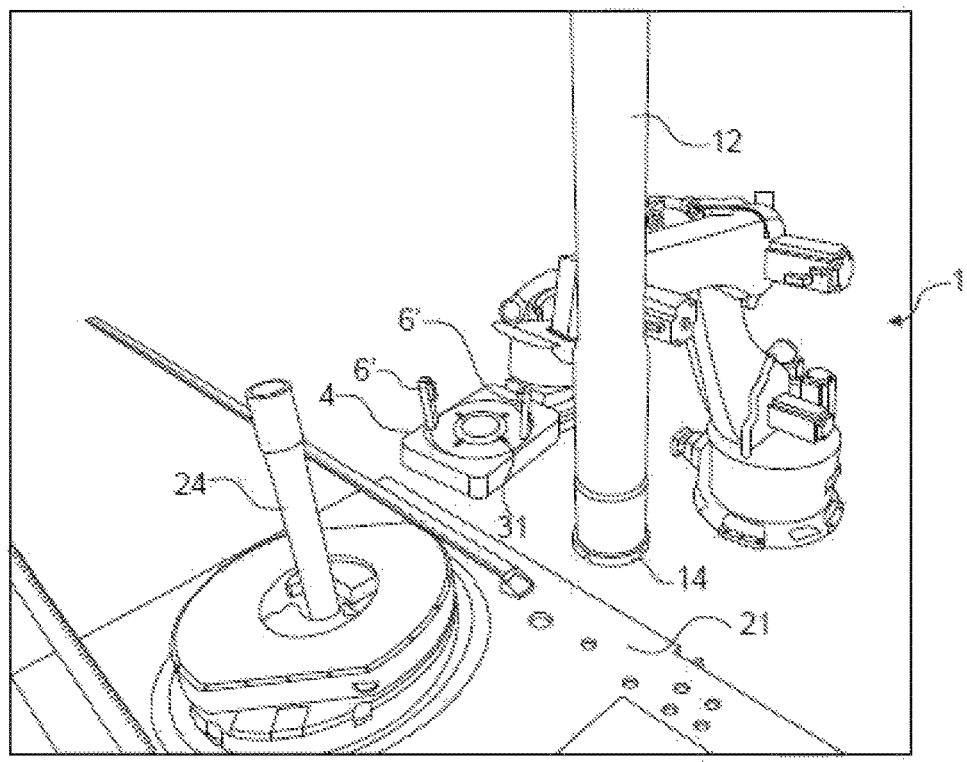

FIGS. 5-8 illustrate the process of preparing the tubular 12 for connection to the drill string 24. As shown in FIG. 5, the pipe handling machine 22 (see FIG. 4) holds the tubular 12 in a vertical orientation above the drill floor 21. The tubular 12 may be held above the well centre opening 23, or adjacent the well centre opening 23. The machine 1 is then moved such that the tool 4 can engage the protective cap 14.

As can be seen from FIG. 5, in this embodiment, the engagement elements 6' are actuable arms (or "fingers"), which can be controlled to selectively grip and hold the protective cap 14. The arms 6' can, for example, be hydraulically controlled so as to engage the cap 14 at an outer circumference thereof.

Figure 6:
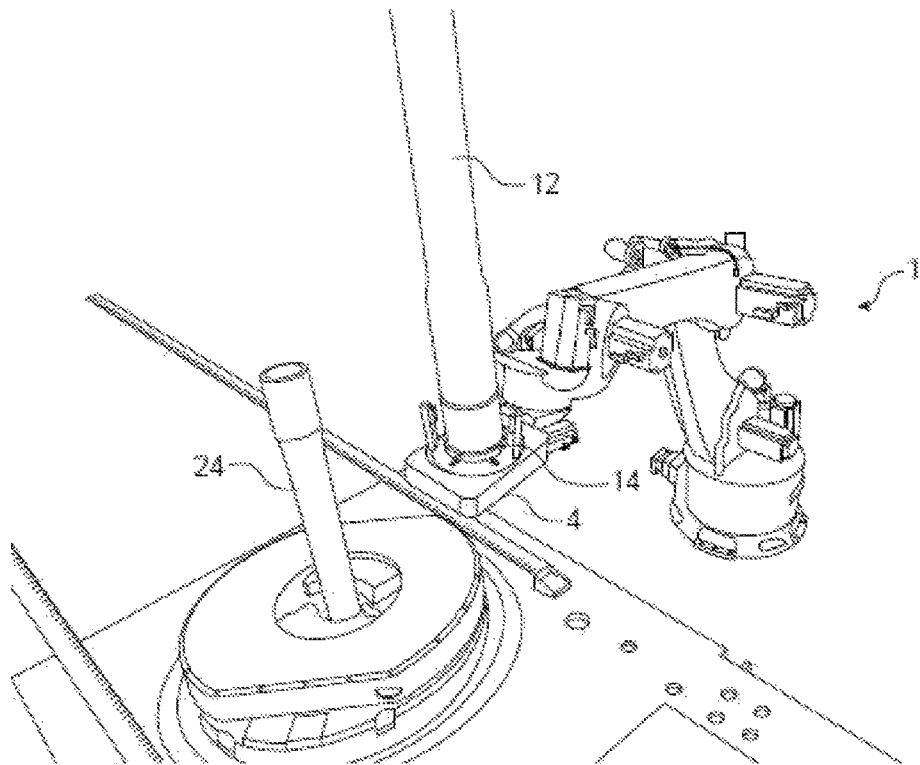
Figure 7:
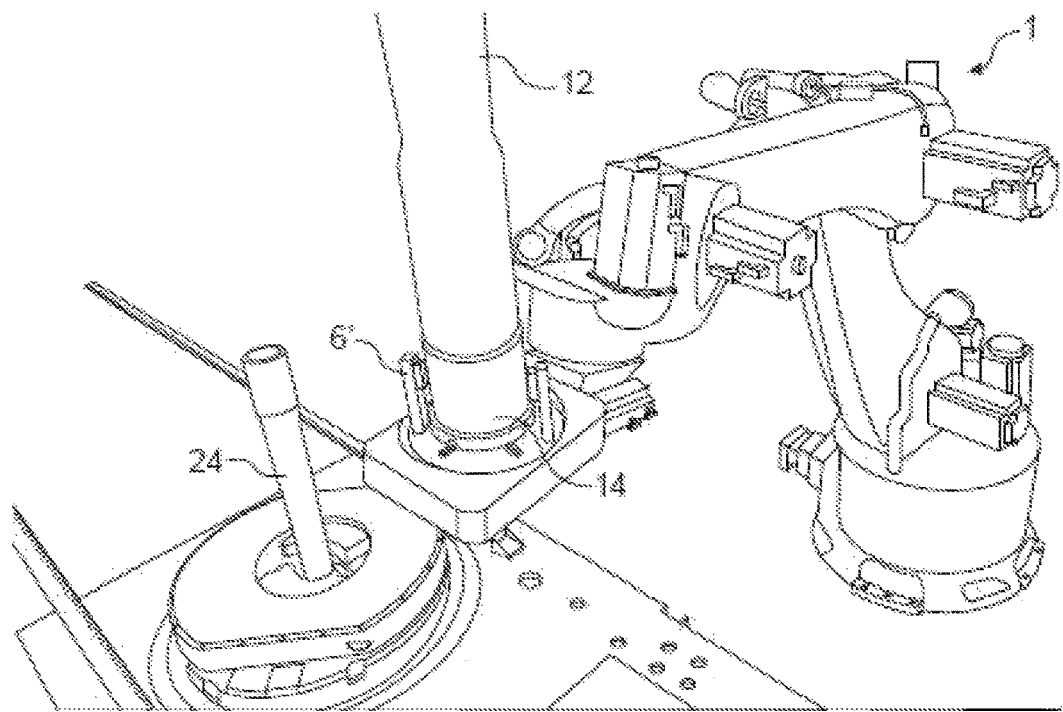
Figure 8:
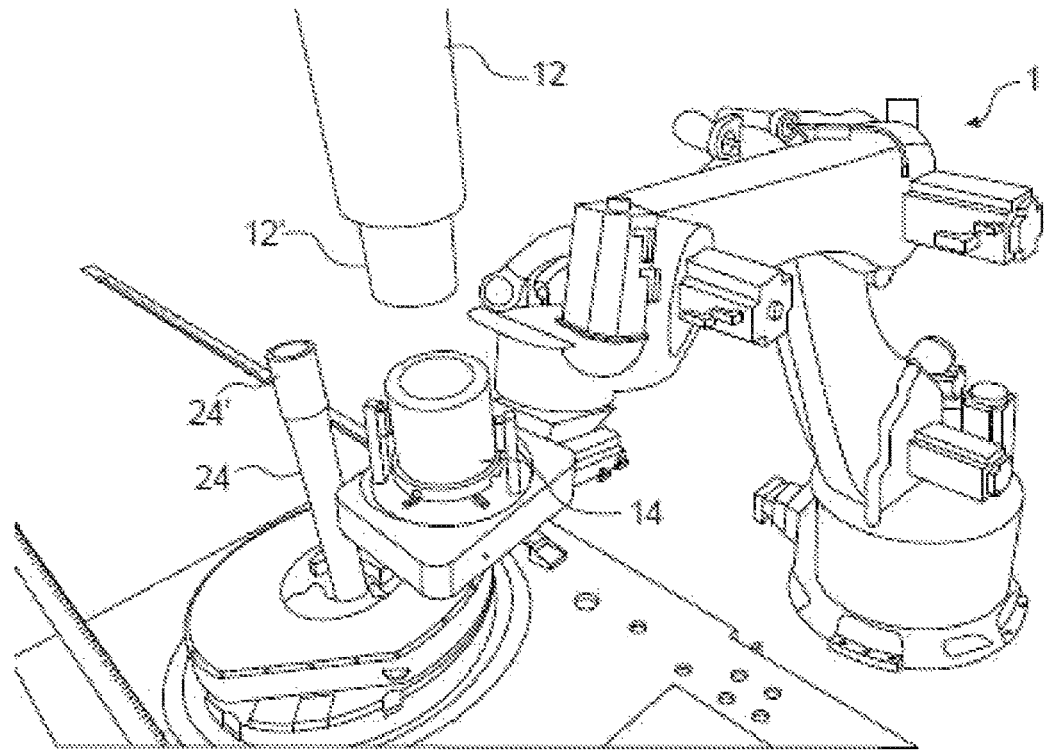

FIG. 6 illustrates the machine 1 and the pipe handling machine 22 having positioned the tool 4 directly below and adjacent the cap 14. In FIG. 7, the arms 6' have been activated so as to grip the cap 14. The tubular 12 is then rotated by means of spinners in the pipe handling machine 22 so as to spin out the threaded section 12' of the tubular 12 from the cap 14. Alternatively, as described above, the tool 4 may have this functionality, for example by arranging the arms 6' on a rotatable disc within the tool 4.

The cap 14 is then removed from the drill floor area along with the tool 4 and the arm 3. The tubular 12 is now ready for being connected to the box end tool joint 24' of the drill string 24.

Optionally, the cap 14 may have a shape, such as a protrusion, depression, slot or groove, which engages and interacts with a corresponding shape on the tool 4, which may also be a protrusion, depression, slot or groove. FIG. 3 illustrates slots 30 at an outer end of the cap 14 which engage corresponding protrusion 31 (see FIG. 5) in the tool 4. When the tool 4 is positioned such that it engages the cap 14, as in FIGS. 6-8, these shapes engage each other to provide a rotational lock between the tool 4 and the cap 14. By rotating the tool 4 (or a part thereof), or by rotating the tubular 12, a secure removal (spinning out) or installation of the cap 14 can be obtained. This may eliminate the need for the arms 6' or reduce the requirements of the arms 6', for example so that the arms 6' mainly need to hold the cap 14 in place for positioning purposes, while the torque required for spinning in or spinning out is provided through the engagement between the corresponding shapes.

The machine 1 may be arranged to pick up or lay down the protective caps from a separate storage. The separate storage may be spaced from the drill floor, or at least spaced from a red zone on the drill floor. The machine 1 may be configured to automatically lay down or pick up protective caps, or there may be personnel present to do this, for example placing a cap in the receiver 5 or removing a cap from the receiver 5. Advantageously, the personnel required for this operation can be located in a safe area (or a safer area) compared to the drill floor and/or the red zone. The red zone may, for example, be considered to be the operating area of the pipe handling machine 22.

With reference to FIG. 4, the storage area may be located behind the machine 1. i.e. such that the machine 1 is arranged between the storage area and the well centre opening 23. This means that personnel will not be required to enter the area around the well centre opening 23 where the pipes are handled (typically considered to be a red zone area) to remove the protective cap 14.

Figure 9:
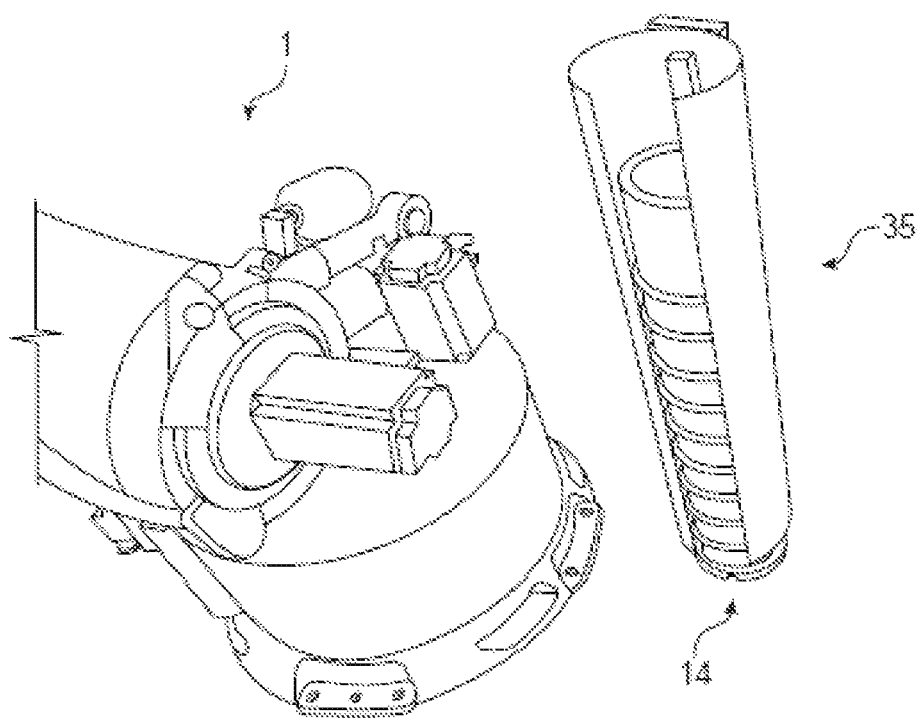
FIGS. 9-11 illustrate an embodiment of a drilling plant comprising a magazine.
Figure 10:
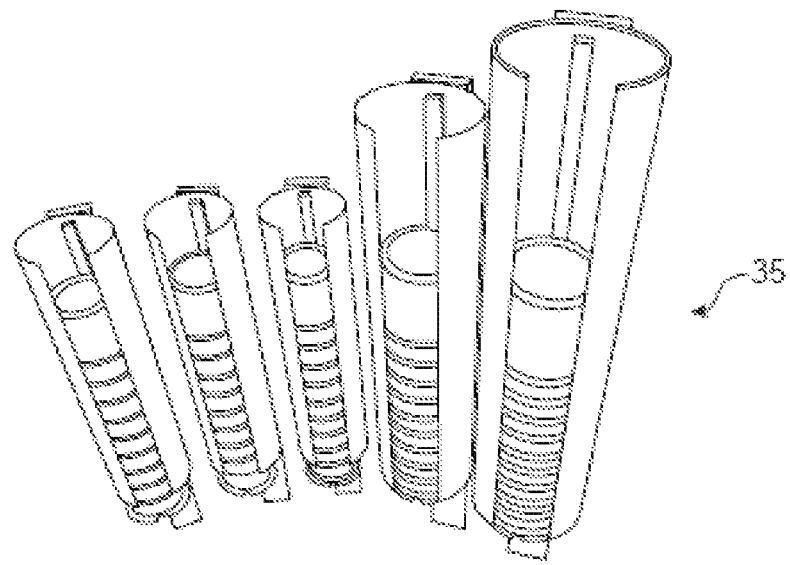
Figure 11:
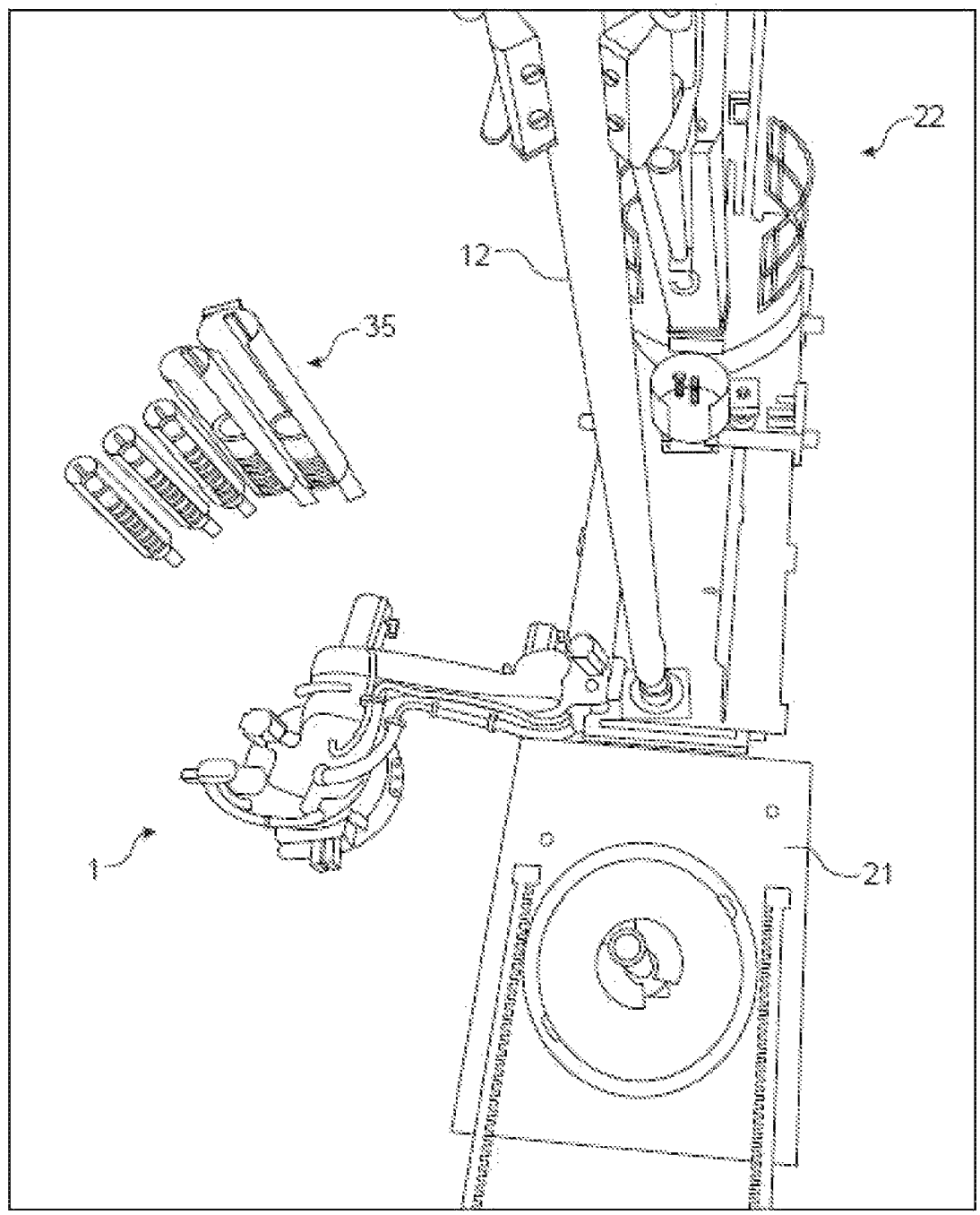

Illustrated in FIGS. 9-11, in one embodiment, the storage area comprises a magazine 35 for storing a plurality of caps 14. The magazine 35 may be arranged within a reaching distance of the machine 1, as illustrated in FIG. 9.

Shown in FIG. 10, the magazine 35 may have a plurality of individual magazine units. In this embodiment, the magazine 35 comprises a tube-shaped structure to hold the (generally cylindrical) caps 14. The magazine 35 may be arranged so that the machine 1 is operable to pick up and/or place a cap 14 from/into the magazine 35 without human intervention. For example, in this embodiment, the tube may allow stacking of the caps 14 from the bottom, such that the machine 1 can pick up a cap 14 from the bottom at any time (or place a cap 14 in the bottom of the stack), akin to a cup dispenser type arrangement. The tube may for example have a spring-loaded mechanism inside, if necessary, to hold the caps 14 in place and ensure that one cap 14 is always available at the bottom. The machine 1 may then move the tool 4 to the magazine 35, engage the arms 6' to pick up the lowermost cap 14, and move the tool 4 towards the tubular 12, or conversely remove a cap 14 from the tubular 12 and move to the magazine 35 while holding the cap 14 with the arms 6', and place the cap 14 in the bottom of the magazine 35. Optionally, a human operator may be positioned near the magazine 35 to assist with these operations.

The machine 1 may be controlled by an operator which is, for example, within a driller's cabin or from a location at or near the drill floor, but which is not directly within the red zone area. Alternatively, or additionally, the machine 1 may be automatically or semi-automatically controlled with sensors and e.g. cameras assisting the machine 1 when moving the tool 4 towards the drilling tubular end.

Advantageously, systems and methods of the first aspect allow drilling operations to be carried out in a safer and more efficient manner, for example by means of removal of personnel in red zone on drill floor.

In a second aspect, there is provided apparatus for and method of cleaning a drill string used for drilling a wellbore for oil and/or gas production.

When a pipe section is retrieved from a well bore, chunks of clay or other debris are typically stuck to the pipe section. Typically, these are removed manually by a member of the rig crew in the red zone using a pressure washer as the pipe section is pulled up above the drill floor.

It is known to provide for automatic cleaning of the BHA and casing using a washer which is mounted in the rotary under the drill floor. The washer includes an inner ring with 5-7 nozzles in a circle through which water from the rig's high-pressure cleaning system is sprayed onto the BHA as it moves upwards to the well centre opening in the drill floor. The flow of water to the nozzles is controlled using a valve which is operated remotely using a spring loaded foot pedal or an on/off switch in the driller's cabin.

The invention is not limited by the embodiments described above; reference should be had to the appended claims.

The invention claimed is:

1. A machine for a drilling plant, the machine comprising:
a base;
an arm; and
a tool which is carried by the arm, the tool comprising a receiver for a protective cap and a plurality of engagement elements which are configured to engage an outer circumference of the protective cap so as to hold the protective cap fixed,
wherein,
the machine is operable to engage the protective cap and to remove or to install the protective cap from or on an end of a drilling tubular.

2. The machine as recited in claim 1, wherein the plurality of engagement elements comprise:
a plurality of flexible members which are fixed on an inside of a circumferential holder, or
a plurality of movable arms which are operable to engage the outer circumference of the protective cap.

3. A machine for a drilling plant, the machine comprising:
a base;
an arm;
a tool which is carried by the arm, the tool comprising a receiver for a protective cap; and
a motor which is arranged on the arm,
wherein,
the machine is operable to engage the protective cap and to remove or to install the protective cap from or on an end of a drilling tubular,
the receiver is rotatable and operable to spin in or to spin out the protective cap from the end of the drilling tubular, and
the receiver is rotatable via the motor.

4. The machine as recited in claim 3, wherein the tool further comprises a plurality of engagement elements which are configured to engage an outer circumference of the protective cap.

5. A drilling plant comprising:
a machine for a drilling plant, the machine comprising,
   a base,
   an arm, and
   a tool which is carried by the arm, the tool comprising a receiver for a protective cap,
   wherein,
   the machine is operable to engage the protective cap and to remove or to install the protective cap from or on an end of a drilling tubular;
a pipe handling machine; and
a storage area for the protective cap,
wherein,
the machine is arranged on or adjacent to a drill floor and is operable to engage the drilling tubular when the drilling tubular is held in a vertical position by the pipe handling machine,
the pipe handling machine has an operating area, and
the storage area is spaced from the operating area of the pipe handling machine.

6. The drilling plant as recited in claim 5, wherein the machine is arranged:
   between the operating area of the pipe handling machine and the storage area;
   between the drill floor and the storage area; and/or
   between a well center opening and the storage area.

7. The drilling plant as recited in claim 5, wherein the storage area comprises a magazine for holding a plurality of protective caps.

8. The drilling plant as recited in claim 7, wherein the machine is further operable to at least one of retrieve the protective cap from the magazine without human intervention and to place the protective cap in the magazine without human intervention.

9. A drilling plant comprising:
a machine for a drilling plant, the machine comprising,
   a base,
   an arm, and
   a tool which is carried by the arm, the tool comprising a receiver for a protective cap,
   wherein,
   the machine is operable to engage the protective cap and to remove or to install the protective cap from or on an end of a drilling tubular; and
a pipe handling machine,
wherein,
the machine is arranged on or adjacent to a drill floor and is operable to engage the drilling tubular when the drilling tubular is held in a vertical position by the pipe handling machine,
the protective cap comprises a first section,
the tool comprises a second section, and
the first section and the second section each have with a shape so that the protective cap and the tool can be rotationally interlocked when brought into engagement.

10. The drilling plant as recited in claim 9, wherein the first section and the second section each further comprise a protrusion, a depression, a slot or a groove.

11. A method for operating a drilling plant, the method comprising:
   bringing a tubular into an operating area of a drill floor, the tubular comprising a protective cap at an end thereof;
   bringing a tool into engagement with the protective cap, the tool being arranged on a machine comprising an arm which is movable into the operating area;
   removing the protective cap from the tubular with the tool; and
   operating the machine so as to bring the protective cap out of the operating area with the tool,
   wherein the step of removing the protective cap comprises:
   rotating the tubular while holding the protective cap fixed with the tool, or
   operating the tool to rotate the protective cap while holding the tubular fixed.

12. The method as recited in claim 11, further comprising:
   operating the machine so as to place the protective cap in a storage area.

13. The method as recited in claim 12, wherein the step of operating the machine so as to place the protective cap in the storage area further comprises placing the protective cap in a magazine in the storage area.

14. A method for operating a drilling plant, the method comprising:
   bringing a tubular out of a well and into an operating area of a drill floor;
   bringing a tool holding a protective cap into the operating area, the tool being arranged on a machine comprising an arm which is movable into the drill floor area;
   placing the protective cap on an end of the tubular with the tool;
   operating a pipe handling machine so as to bring the tubular out of the operating area; and
   operating the machine to pick up the protective cap from a storage area.

15. The method as recited in claim 14, wherein the step of placing the protective cap on the end of the tubular with the tool comprises:
   rotating the tubular while holding the protective cap fixed with the tool, or
   operating the tool to rotate the protective cap while holding the tubular fixed.

16. The method as recited in claim 14, wherein the step of operating the machine to pick up the protective cap from the storage area comprises picking up the protective cap from a magazine in the storage area.

* * * * *